United States Patent [19]
Booker

[11] 3,721,177
[45] March 20, 1973

[54] COMMERCIAL BARBEQUE COOKER

[76] Inventor: William E. Booker, 3039 Kingston Pike, Knoxville, Tenn. 37919

[22] Filed: Nov. 5, 1971

[21] Appl. No.: 195,969

[52] U.S. Cl............................................99/331
[51] Int. Cl................................................A23b 1/04
[58] Field of Search...............99/259, 260, 261, 262; 126/59.5

[56] References Cited

UNITED STATES PATENTS

| | | | |
|---|---|---|---|
| 2,352,590 | 6/1944 | Trinkle | 99/259 X |
| 2,505,973 | 5/1950 | Julian | 99/259 |
| 2,625,095 | 1/1953 | Julian | 99/259 |
| 2,640,414 | 6/1953 | Jensen | 99/259 |
| 3,199,436 | 8/1965 | Rasmussen et al. | 99/259 |
| 3,266,409 | 8/1966 | Oyler | 99/259 |
| 3,513,823 | 5/1970 | Fessmann | 99/259 X |

Primary Examiner—Robert W. Jenkins
Assistant Examiner—Arthur O. Henderson
Attorney—William B. Kerkam, Jr. et al.

[57] ABSTRACT

A commercial barbeque cooker has a cooking room in which the meats to be barbequed are supported on racks. The room is heated by a remote hardwood burner which discharges hot smoke and gases into the circulating duct system of the room. The meat is subjected to the heat of the combustion gases from the hardwood burner in the range of 225 to 260°F. to barbeque the meat. Smoke from a separate smoke generator is admitted into the circulating duct system of the room as required. The circulation of the hot combustion gases is uniform and downward from the top of the room through the meat in the racks and then upwardly for recirculation.

9 Claims, 4 Drawing Figures

INVENTOR
WILLIAM E. BOOKER

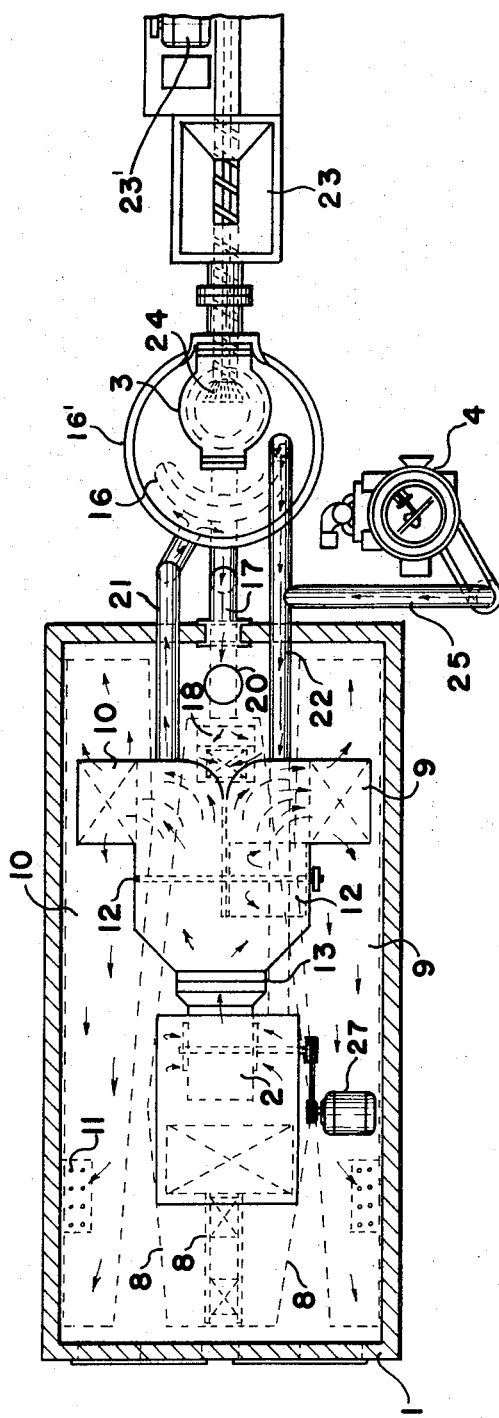

INVENTOR
WILLIAM E. BOOKER

COMMERCIAL BARBEQUE COOKER

BACKGROUND OF THE INVENTION

Federal regulations governing meat inspection require that barbequed meats be cooked by the direct action of dry heat resulting from the burning of hardwood or the hot coals therefrom for a sufficient period of time to permit the product to assume the usual characteristics of the barbequed article which includes the formation of a brown crust on the surface and the rendering of surface fat. The weight of the barbequed meat shall not exceed 70 percent of the weight of the fresh uncooked meat.

Heretofore in commercial barbequeing of meats, the meats are usually distributed over a grill and cooked by the heat of hardwood burning under the grill.

The grease and drippings from the meat fall directly onto the fire causing great irregularities in cooking temperatures and charring and burning of the meat.

To avoid the difficulties adherent in the direct barbequing of meat over a fire, it has heretofore been proposed to conduct the hot gases from a hardwood fire into a cooking area where the meat to be barbequed is located and to catch the drippings from the meat in pans disposed beneath the meat. However, these prior art devices have only been suitable for domestic purposes for limited size cookers and have not been suitable for large scale commercial barbequing of meats involving the cooking of several tons of meat at a time.

The prior art referred to may be generally classified as foods with preservation by smoking and cooking. Representative of such patents are the two Oyler Pat. Nos. 3,041,959 and 3,266,409 granted, respectively, on July 3, 1962 and Aug. 16, 1966 as well as U.S. Pat. No. 2,558,569 to G. C. Koch granted on June 26, 1951 while the Cogar Pat. No. 2,851,941, granted on Sept. 16, 1958, shows circulation of the gases of combustion from a remote fire downwardly over meat in a barbequed cooker.

The present invention overcomes the difficulties inherent in the prior art structures and provides a commercial barbeque cooker in which large quantities of meat, chicken, beef and pork, can be uniformly barbequed to meet the requirements of the Federal regulations referred to above with reasonable cooking times; with minimum consumption of fuel and maximum utilization of the hot gases and smoke provided by the hardwood fire.

SUMMARY OF THE INVENTION

A commercial barbeque cooker has a cooking room with racks supporting the meat to be barbequed therein with combustion gases from a remotely located hardwood fire circulated downwardly from the top of the room uniformly at volumes of about 1300 cubic feet per minute at barbequing temperatures in the range of from 200° to 250°F. for periods of from 2-9 hours. Smoke as required is separately introduced into the circulating combustion gases and the hot combustion gases are cycled alternately from one side of the top of the room to the other side of the room for uniform circulation downwardly and upwardly over the meat to be barbequed with recirculation of the hot combustion gases back to a heater. The feed of wood chips to the fire is thermostatically controlled to maintain the cooking temperature in the room and the draft on the fire is adjusted by controlling the volume of the recirculated combustion gases.

BRIEF DESCRIPTION OF THE DRAWINGS

A preferred embodiment of the present invention is shown in the accompanying drawings in which like reference characters indicate like parts. In these drawings.

FIG. 2 is a partial sectional view from above of the embodiment of FIG. 1;

DESCRIPTION OF THE PREFERRED EMBODIMENT

Figure 1:
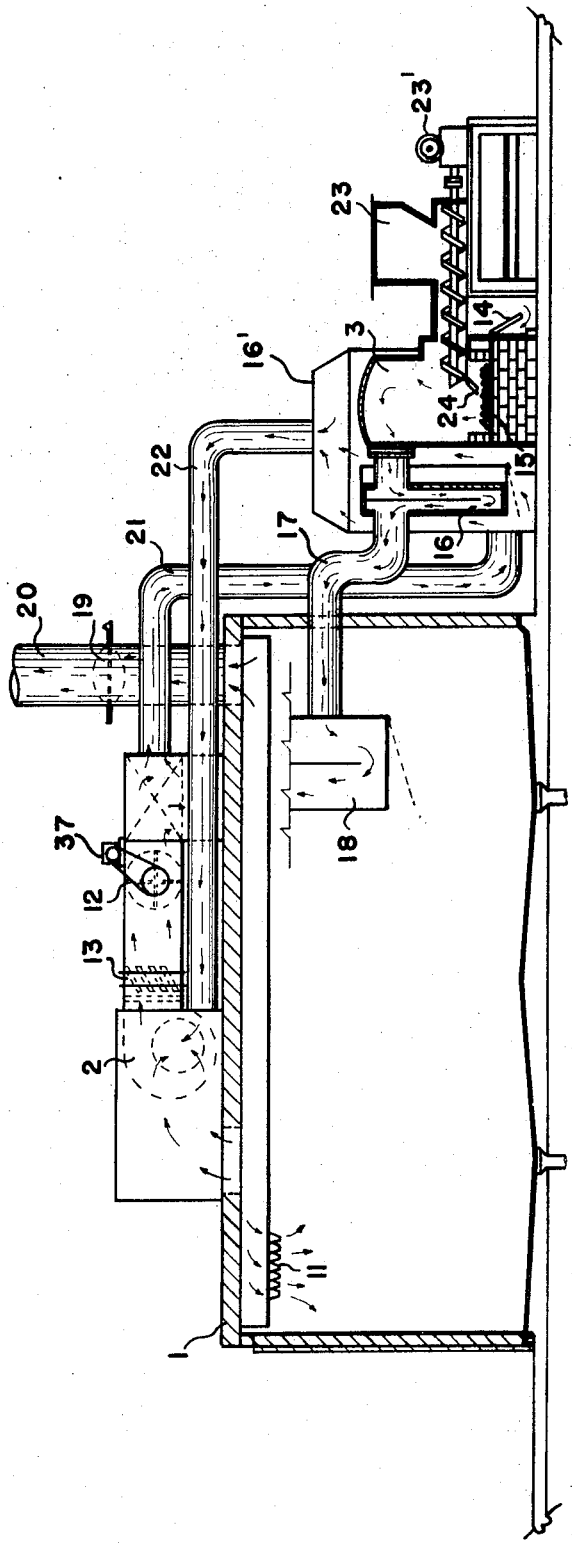
FIG. 1 is a side elevation, partly in section, of a preferred embodiment of the present invention showing the several elements thereof and the direction of circulation of the gases therein.

Referring now to the several figures, the commercial barbeque cooker there shown has a heated enclosure or a room which may have approximate dimensions of 20' by 9 feet 10 inches by 8 feet 8 inches and capable of holding in supporting racks 5 up to 5600 pounds of chicken or 10,000 pounds of pork or beef. A motor driven fan 2 circulates hot combustion gases in room 1 as will be more fully described hereinafter at about 1300 cubic feet per minute. The combustion gases are provided by a thermostatically controlled stoker fed wood burner or furnace 3. A separately controlled smoke generator 4 is provided.

The cooking temperature in room 1 is controlled by thermostat 7 and the amount of smoke provided by smoke generator 4 is controlled manually or by a time clock.

Fan 2 provides a high rate of hot combustion gas circulation within room 1 by drawing the heated gases in the room into return duct 8 which duct is provided with adjustable slides 8' to control the volume of return air. Hot combustion gases from wood burner 3 are admitted to the intake of fan 2 and the mixture of recirculation and hot gases is distributed alternately to each side of the top of room 1 to supply ducts 9 and 10 and is discharged downwardly through nozzles 11 which extend the full length of both of ducts 9 and 10 and the full length of room 1.

Opposed dampers 12, disposed at 180° to each other, are motor rotated and receive the full gas volume from fan 2 to discharge the full gas volume alternately on each side of room 1 through duct 9 and then through duct 10 to assure equalization of gas movement in room 1. Damper 12 rotates at about 4 revolutions per minute.

A motor driven volume damper 13 may be interposed between the outlet of fan 2 and dampers 12 to control the total quantity of gas circulation.

As noted above, stoker fed woodburner 3 is actuated on demand by thermostat 7 to supply wood chips from hopper 23 to motor driven screw 23' for distribution over grate 15 by forked grid 24.

Flow of air for combustion in burner or furnace 3 is induced by fan 2 and enters burner 3 at air supply damper 14 and then passes through grate 15 together with the gaseous products of combustion. The combustion gases leave burner 3 and pass through drum heater 16 and burner stack 17 which passes through the wall of room 1 and into fly ash separator 18. The heat from fly ash separator 18 provides radiant heat within room 1. The hot gases of combustion from fly ash separator 18 pass into return air duct 8 where mixing with recirculated gases occurs and then through fan 2 to supply ducts 9 and 10, nozzles 11 and into room 1.

As noted above, the volume of air required for combustion of the wood chips in furnace 3 is determined by the setting of the adjustable slides 8' on the sides and bottom of return air duct 8 and by adjustment of damper 19 in stack 20 which vents room 1 to outside atmosphere.

Drum heater 16 is mounted within a jacket 16' enclosing burner 3. A jacket supply duct 21 is connected from the discharge side of fan 2 to the bottom of jacket 16'. A return air duct 22 leads from jacket 16' to the inlet side of fan 2 and returns the gases to fan 2 heated by drum heater 16. The pressure difference existing across fan 2, therefore produces circulation through jacket 16' and over drum heater 16.

Smoke generator 4 using hickory sawdust to produce required smoke, as is well known in the art, is connected by generator stack 25 to return air duct 22 and to the inlet of fan 2 so that smoke may be added as required in the circulating system for room 1. A remote thermometer 26 has its bulb located below the return air duct 8 to show the cooking temperature within room 1.

Figure 4:
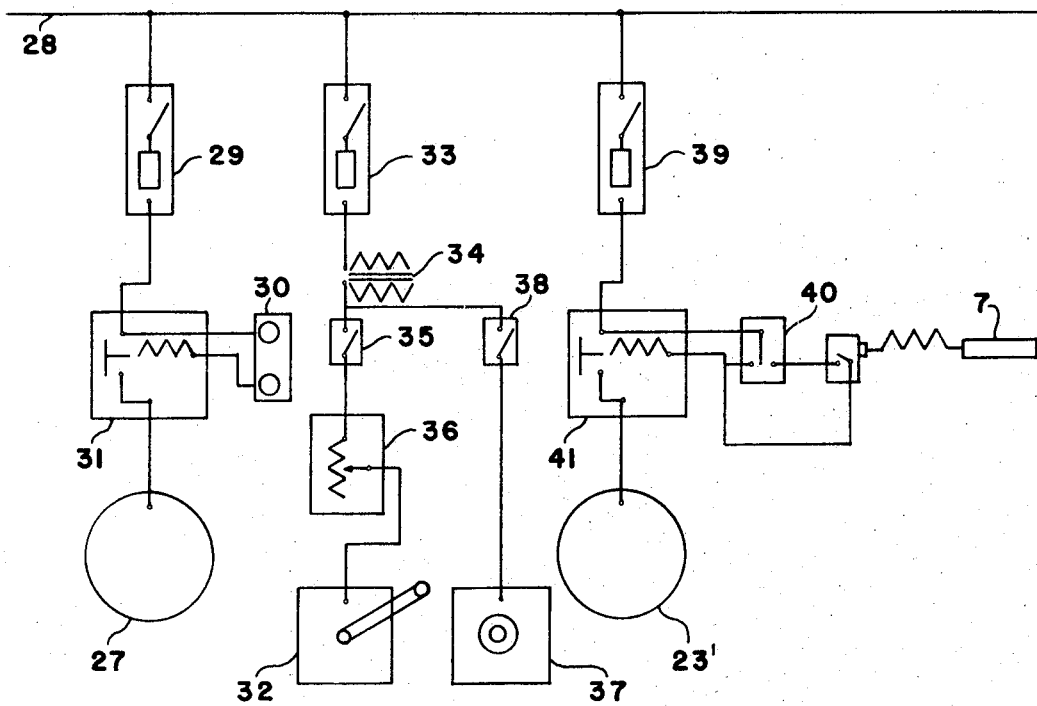
FIG. 4 is a circuit diagram of the electrical system utilized with the embodiment of FIG. 1.

With reference now to FIG. 4, fan 2 is driven by motor 27 which receives electricity from 220 volt line 28, through circuit breaker 29 and off and on switch 30 energizing relay 31. Volume damper 13 is driven by motor 32 which is energized from line 28 through circuit breaker 33 and transformer 34, manual switch 35 and positioner 36. Damper 12 is rotated by a motor 37 which is connected through manual switch 38 to one side of transformer 34.

Motor 23' for the feed for furnace 3 is energized from line 28 through circuit breaker 39 and, as noted above, is under control of thermostat 7 and may be manually or automatically controlled by switch 40 energizing relay 41.

Figure 3:
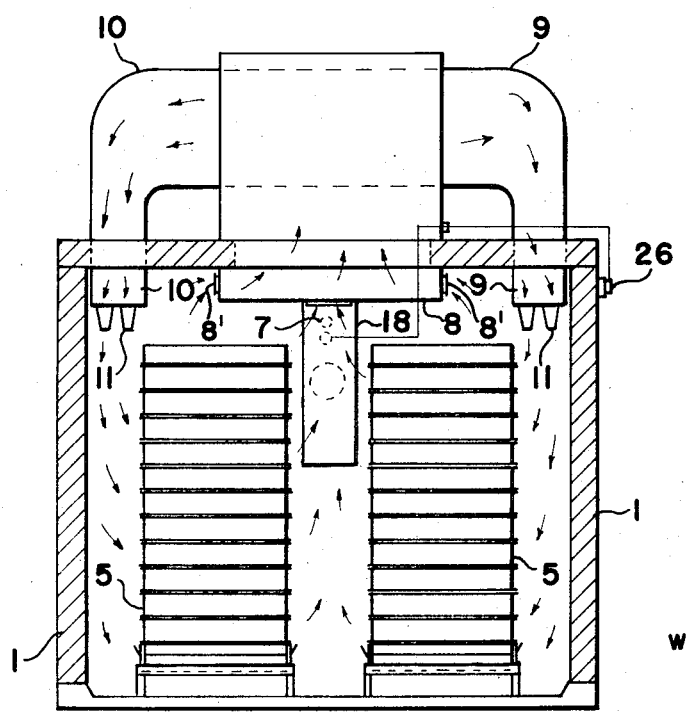
FIG. 3 is an end view, partially in section, as seen from the left of the embodiment of FIG. 1.

In summary, the preferred embodiment of the present invention described above functions to barbeque meat on the racks 5 in room 1 by circulating the hot gases of combustion from furnace 3 downwardly in room 1 and then upwardly and through the racks of meat as shown by the arrows in FIG. 3. Fan 2 draws the gases of combustion from furnace 3 through drum heater 16 and duct 17 to fly ash separator 18 and then forces the hot gases of combustion through volume damper 13 and rotating dampers 12 whereby the total volume of combustion gases is alternately directed to supply ducts 9 and 10 for alternate discharge of the gases of combustion downwardly through nozzles 11 along the length of room 1. The gases of combustion are withdrawn from room 1 through jacket supply duct 21 to the bottom of jacket 16' surrounding the furnace 3 and are there reheated by drum heater 16 for return through duct 22 to the intake of fan 2. Thermostat 7 in room 1 controls the cooking temperature in room 1 by energizing motor 23' which spreads wood chips onto the fire on grate 15 evenly over forked grid 24.

Uniform cooking and barbequeing of commercial quantities of meat on racks 5 in room 1 is provided by the control of the circulation of the gases of combustion in room 1 as above-described and by the exact temperature control of these gases both by stoker control and by reheating of the gases by the drum heater.

The barbequing cycle may either by entirely automatic or may be manually controlled by the circuitry of FIG. 4. The addition of smoke from smoke generator 4 may either be manually controlled or on a timed cycle and of a duration depending upon the type of meat being barbequed and the desired smoky taste thereof.

Changes may now be suggested to those skilled in the art to the preferred embodiment of the present invention described above without departing from the present inventive concept. Reference should therefore be had to the appended claims to determine the scope of this invention.

What I claim is:

1. A commercial barbeque cooker comprising a room, racks in said room for the meat to be barbequed, a wood burning furnace outside said room, duct means from said furnace into said room, a fly ash collector in said room connected to said duct means, a circulating fan connected to said collector, spaced room ducts at the top of said room, said fan discharging alternately into said room ducts, nozzles in said room ducts extending the length of said room and discharging downwardly in said room, a return duct at the top of said room, a reheater associated with said furnace, duct means from said return duct to said reheater and duct means from said reheater to said fan whereby the hot gases of combustion from said furnace are uniformly and evenly directed over the meat in said room.

2. A cooker as described in claim 1, said duct means from said furnace including said reheater.

3. A cooker as described in claim 1, including a jacket over said furnace, said duct means from said return duct opening into said jacket, said duct means from said reheater to said fan opening into said jacket, said reheater being within said jacket.

4. A cooker as described in claim 1, including a rotating damper between said fan and said room ducts alternately directing the discharge of said fan into said room ducts.

5. A cooker as described in claim 1, including a stack opening into said room and a damper in said stack.

6. A cooker as described in claim 1, including a volume damper controlling the discharge of said fan.

7. A cooker as described in claim 1, including a fuel feeder for said furnace and thermoresponsive means subject to temperatures in said room actuating said feeder.

8. A cooker as described in claim 1, including slide dampers in said return duct controlling recirculation of the gases of combustion in said room.

9. A cooker as described in claim 1, including a smoke generator discharging into said duct means from said reheater to said fan.

* * * * *